United States Patent [19]

Hayakawa

[11] Patent Number: 4,810,681
[45] Date of Patent: Mar. 7, 1989

[54] METHOD OF MANUFACTURING DENSE CORDIERITE

[75] Inventor: Issei Hayakawa, Nagoya, Japan

[73] Assignee: NGK Insulators, Ltd., Nagoya, Japan

[21] Appl. No.: 63,771

[22] Filed: Jun. 24, 1987

Related U.S. Application Data

[63] Continuation of Ser. No. 724,894, Apr. 19, 1985, abandoned.

[30] Foreign Application Priority Data

Jul. 3, 1984 [JP] Japan ................. 59-136541

[51] Int. Cl.$^4$ ................................ C04B 35/18
[52] U.S. Cl. ............................ 501/119; 264/63; 501/104; 501/105; 501/118
[58] Field of Search ............. 501/118, 119, 105, 104; 264/63

[56] References Cited

U.S. PATENT DOCUMENTS

| 3,979,216 | 9/1976 | Fritsch | 501/119 |
| 4,225,354 | 9/1980 | Rao | 501/119 |
| 4,235,855 | 11/1980 | Cleveland | 501/119 |
| 4,280,845 | 7/1981 | Matsuhisa | 264/66 |
| 4,367,292 | 1/1983 | Sano et al. | 501/119 |
| 4,495,300 | 1/1985 | Sano | 501/119 |

OTHER PUBLICATIONS

Stanley et al, Attrition Milling of Ceramic Oxides, Ceramic Bulletin, vol. 53, No. 11 (1974), pp. 813-815.

Primary Examiner—James Derrington
Attorney, Agent, or Firm—Parkhurst, Oliff & Berridge

[57] ABSTRACT

Disclosed herein is a method of manufacturing dense cordierite, which includes steps of molding a powder mainly consisting of cordierite crystals and having an average particle size of not more than 5 μm, firing a resulting molding at a temperature of from 1,350° to 1,430° C., whereby the sintered body having a porosity of not more than 6% and a bulk specific gravity of not less than 2.4 is obtained.

5 Claims, No Drawings

METHOD OF MANUFACTURING DENSE CORDIERITE

This is a continuation of application Ser. No. 724,894 filed Apr. 19, 1985 now abandoned.

BACKGROUND OF THE INVENTION (1) Field of the Invention

The present invention relates to a method of manufacturing a dense cordierite sintered body, and more particularly, the invention relates to a method of manufacturing a dense cordierite sintered body with a high strength by using a fine powder mainly consisting of cordierite crystals.

(2) Description of the Prior Art

Cordierite has been used as a catalyst carrier for automobiles, heat exchangers and so on because it is excellent in the thermal shock property due to its small coefficient of thermal expansion and heat resistance.

As the method of producing cordierite sintered bodies, there has been employed a method as disclosed in Japanese Patent Application Laid-open No. 82,822/1978 in which a raw material such as talc, kaoline and aluminum hydroxide is prepared to give the composition of cordierite, and then molded and fired.

However, this method has the defect that a liquid phase is temporarily formed during the firing, and the cordierite is produced through the liquid phase, so that the resulting cordierite is likely to be porous to not result in a dense sintered body. In order to obtain dense cordierite, as described in Japanese Patent Publication No. 37,908/1976, there is also known a method of crystallizing cordierite through the crystallization treatment of melted glass under coolin, but this method unfavorably necessitates the crystallization treatment, thereby rendering the producing steps more complicated.

The present invention has been accomplished to resolve the above-mentioned drawbacks encountered by the conventional methods.

SUMMARY OF THE INVENTION

It is therefore an object of the present invention to provide a method of easily manufacturing a dense cordierite sintered body.

According to the present invention, there is a provision of the method of manufacturing a dense cordierite sintered body which method comprises steps of molding a powder mainly consisting of cordierite crystals and having the average particle size of not more than 5 μm, firing a resulting molding at a temperature of from 1,350° C. to 1,430° C., whereby the sintered body having a porosity of not more than 6% and a bulk specific gravity of not less than 2.4.

These and other objects, features and advantages of the invention will be well appreciated upon reading of the description of the invention with the understanding that some modifications, variations and changes of the same could be easily done by the skilled in the art to which the invention pertains without departing from the spirit of the invention or the scope of the claims appended thereto.

DETAILED DESCRIPTION OF THE INVENTION

The method of manufacturing dense cordierite according to the present invention will be explained more in detail.

In the present invention, as a molding raw material, use is made of a powder mainly consisting of cordierite crystals and having an average particle size of not more than 5 μm. The cordierite powder with the average particle size of not more than 5 μm is prepared by formulating a raw material such as talc, magnesium carbonate, magnesium hydroxide, magnesium oxide, aluminum hydroxide, alumina, kaolin, and amorphous silica to give the cordierite composition, firing the raw material to produce cordierite, and milling the resulting cordierite by a mechanical milling means such as a ball mill, a vibration mill, a media stirring type mill and so on. In the alternative, the cordierite powder may be prepared by a chemical process such as coprecipitation, and pyrolysis. It is necessary that the average particle size is not more than 5 μm, preferably 3 μm for the densification. In order to obtain the fine cordierite powder through milling, milling is preferably done by means of a media stirring type mill, for instance, an attrition mill known by a trade name 'Attritor', by using high hardness media made of $ZrO_2$, $Al_2O_3$, or the like.

If the average particle size of the raw material to be molded is less than 0.3 μm, the moldability becomes poor and the molding density becomes smaller, so that the bulk specific gravity after the firing may not be increased. Thus, the average particle size is preferably not less than 0.3 μm but not more then 3 μm. The average particle size used herein is a value measured according to the air permeation method.

The raw material is so formulated that the chemical composition of the milled product mainly corresponds to that of cordierite, but the sintered body may contain not more than 20% of corundum, mullite, sapphirine, spinel, $ZrO_2$, and so on.

Next, after a molding aid such as a binder, and a lubricant is added to the thus prepared powder mainly consisting of cordierite and having an average particle size of not more than 5 μm upon necessity, molding is performed. The molding is carried out according to an ordinary ceramic-molding method such as die pressing, isostatic pressing, extrusion, slip casting, and injection molding. After the molding, the resulting molding is fired at a temperature from 1,350 to 1,430° C., preferably at a temperature of from 1,375 to 1,410° C. As the firing temperature becomes lower, an longer hold time is necessary to attain a sufficient densification. Ordinarily, the firing temperature is held for from 1 hour to 100 hours.

A sintered body having the porosity of not more than 6% and the bulk specific gravity of not less than 2.4 can be obtained. The bulk specific gravity varies depending upon the mixed content of the impurities contained in the raw material and the mixed content from the media in addition to the densification degree of the cordierite sintered body. However, the bulk specific gravity is preferably not more than 2.8 so as to not damage the low coefficient of thermal expansion of the cordierite. The porosity used herein means a real porosity, and is given by the following formula:

Porosity (%) = 100 × (1 − bulk specific gravity ÷ true specific gravity

In the following, the reasons for the numerical restrictions according to the present invention will be described.

The reason why the average particle size of the raw material powder is restricted to not more than 5 μm is that if it exceeds 5 μm, a sufficient densification is not effected, so that the bending strength of the sintered body becomes not more than 3 kg/mm² to make the sintered body poor in practical applicability as a structural material. The reason why the ratio of the cordierite crystals in the raw material powder to be molded is restricted to not less than 80% by weight is that if the this ratio is less than 80% by weight, the component which has not been changed to cordierite produces a liquid phase when being changed to cordierite so that pores are formed in the inside of fired body to make it difficult to obtain a high density sintered body. Further, the reason why the firing temperature is restricted to 1,350° to 1,430° C. is that if the temperature is less than milled product contained 85% of cordierite crystals for the whole weight thereof. After the milled product was dried, 2% of PVA (polyvinyl alcohol) was added thereto as a binder. A rectangular plate of 60 mm in width, 60 mm in length and 7 mm in thickness was then molded from the resultant mixture in a mold under a pressure of 400 kg/cm², which was rubber-pressed under a pressure of 2 tons/cm² and then fired under the firing conditions shown in Table 1.

In order to measure the bulk specific gravity and the bending strength of each fired body, a plate of 10 mm in width, 10 mm in length and 3 mm in height and a rectangular rod of 3x4x40 mm were cut therefrom. Measured results are also shown in Table 1.

TABLE 1

|  | Milling time (hr) | Average particle size (mm) | Firing conditions Temperature (°C.) | Time (hr) | Characteristics of sintered body Bulk specific gravity | Porosity (%) | Four point bending strength at room temperature (kg/mm²) |
| --- | --- | --- | --- | --- | --- | --- | --- |
| Method of the present invention | 100 | 2.0 | 1,400 | 10 | 2.53 | 0.8 | 9.0 |
|  | " | " | 1,410 | 5 | 2.54 | 0.4 | 9.3 |
|  | 70 | 2.4 | 1,350 | 50 | 2.49 | 2.4 | 8.6 |
|  | " | " | 1,400 | 15 | 2.51 | 1.6 | 8.8 |
|  | " | " | 1,420 | 10 | 2.52 | 1.2 | 9.0 |
|  | 50 | 3.0 | 1,380 | 30 | 2.48 | 2.7 | 6.0 |
|  | " | " | 1,400 | 50 | 2.50 | 2.0 | 6.1 |
|  | 30 | 4.7 | 1,400 | 20 | 2.43 | 4.7 | 3.4 |
|  | " | " | 1,430 | 10 | 2.45 | 3.9 | 3.0 |
| Method other than that of the present invention | 20 | 6.4 | 1,400 | 10 | 2.28 | 10.6 | 2.1 |
|  | " | " | 1,430 | 5 | 2.30 | 9.8 | 2.3 |
|  | 10 | 8.8 | 1,400 | 100 | 2.05 | 19.6 | 1.0 |

1,350° C., no sufficient densification occurs, while if it exceeds 1,430° C., the temperature approaches the melting point of the cordierite, so that the sintered body is likely to be softened. The present invention is based on the acknowledgement that the dense cordierite sintered body has been first obtained by the synergistic effects obtained by mainly employing cordierite crystal composition as the raw material to be molded, controlling the average particle size of the molding raw material to not more than 5 μm, and setting the firing temperature at 1,350° to 1,430° C.

The invention will be explained below in more detail with reference to specific Examples which are merely illustrative of the invention but should not be interpreted to limit the scope thereof.

EXAMPLE 1

40 parts by weight of water was added to and mixed with 100 parts by weight of a mixed powder consisting of 33.7% by weight (hereinafter briefly referred to as '%') of talc with an average particle size of 20 μm, 7.5% of aluminum hydroxide with an average particle size of 1 μm, and 58.8% of kaolin with an average particle size of 3 μm, which was then dried and calcined at 1,375° C. for 10 hours.

After the calcined product was coarsely crushed, 300 g of the calcined product, 300 g of water and 1,000 g of alumina media were placed into an alumina pot, milling was carried out for a time period specified in the column 'Milling time' of Table 1. X-ray diffusion results of the thus obtained milled products revealed that every The measurement of the true specific gravity after the sintered body was crushed revealed that the true specific gravity was 2.55. As seen from Table 1, when the average particle size of the cordierite milled product was not more than 5 μm, according to the present invention, the bulk specific gravity of the sintered body was not less than 2.43, and the bending strength was as large as not less than 3 kg/mm².

On the other hand, in the case where the average particle size was more than 5 μm, outside of the range of the present invention, the bulk specific gravity was not more than 2.30 and the porosity wa snot less than 9.8% with the strength being as small as 2.3 kg/mm².

EXAMPLE 2

After each of the raw materials of the same kind and the same composition as used in Example 1 was stirred, mixed and dried, the mixture was calcined at different temperatures to prepare two kinds of calcined products having 90% and 45% of cordierite crystal contents, respectively. Each of the calcined products was coarsely crushed, and a mixture of 50% of the calcined product and 50% of water was milled by means of an attrition mill for 5 hours by using a ZrO₂ media of 5 mm in diameter. The average particle size of the milled product is shown in Table 2.

Thereafter, as in the case of Example 1, a rectangular plate was molded, and fired at 1,400° C. for 5 hours. Then, the bulk specific gravity, the porosity and the bending strength were measured. Measured results are shown in Table 2.

TABLE 2

|  | Cordierite content (%) | Average particle size of milled raw material (μm) | Bulk specific gravity | Porosity (%) | Four point bending strength (kg/mm²) |
| --- | --- | --- | --- | --- | --- |
| Present | 90 | 1.0 | 2.55 | 1.9 | 20.5 |

TABLE 2-continued

| | Cordierite content (%) | Average particle size of milled raw material (μm) | Bulk specific gravity | Porosity (%) | Four point bending strength (kg/mm²) |
|---|---|---|---|---|---|
| invention Comparative example | 45 | 0.95 | 2.35 | 9.6 | 4.2 |

The true specific gravities of the sintered bodies were both measured to be 2.60.

As seen in Table 2, according to the method of the present invention, the high density and high strength of the sintered body with a porosity of 1.9%, and a four point bending strength of 20.5 kg/mm² could be obtained. On the other hand, in the Comparative example, only the low density and low strength sintered body having a porosity of 9.6% and a four point bending strength of 4.2 kg/mm² could be obtained.

As obvious from the foregoing, the present invention is to provide a method of first producing with ease the dense cordierite sintered body by molding the powder mainly consisting of cordierite crystals and having the average particle size of not more than 5 μm and firing a resulting molding at a temperature of 1,350 or 1,430° C. Since the dense cordierite obtained in present invention is excellent in thermal shock resistance, strength, and the airtight property, it is extremely useful as a sealing member, an embedded heater support member, a casing of a turbocharger rotor, an insulating material, and so on.

What is claimed is:

1. A method of manufacturing a dense cordierite body, comprising:
   milling a powder comprising at least 80% by weight of cordierite crystals to an average particle size of not more than 5 μm by utilizing a zirconia grinding media;
   molding said milled powder to form a molded body; and
   firing the molded body at a temperature of from 1,350° to 1,430° C. to from a sintered body, whereby the sintered body has a porosity of not more than 6% and a bulk specific gravity of not less than 2.4.

2. A method according to claim 1, wherein the average particle size of the powder is from 0.3 to 3 μm.

3. A method according to claim 1, wherein the porosity is from 0.05 to 5%.

4. A method according to claim 1, wherein the bulk specific gravity is from 2.4 to 2.8.

5. A method according to claim 1, wherein an amount of zirconium oxide mixed into the milled powder during the milling step is not greater than 20% by weight relative to the amount of cordierite crystals in the milled powder.

* * * * *